(No Model.)
J. E. GIBBS.
CHURN DASHER.
No. 406,395. Patented July 2, 1889.
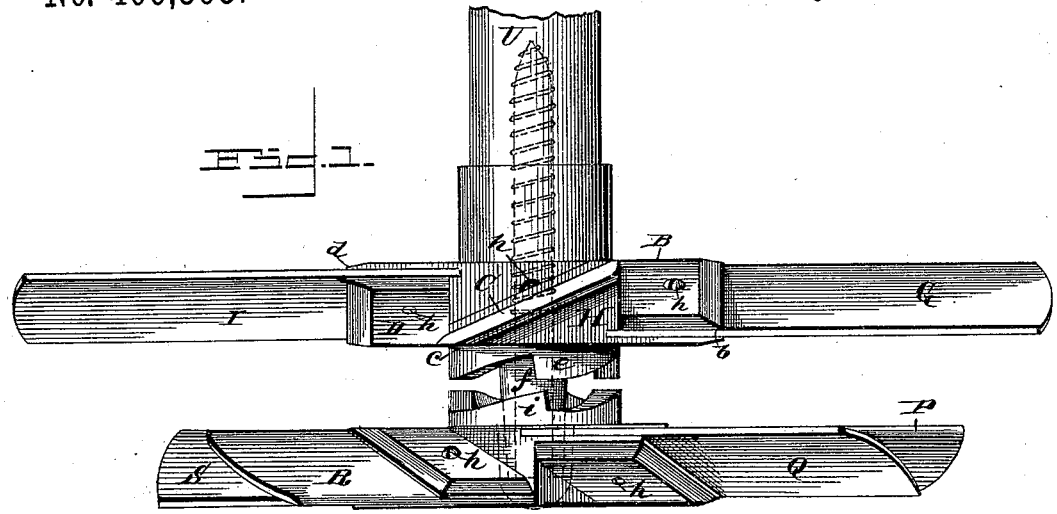
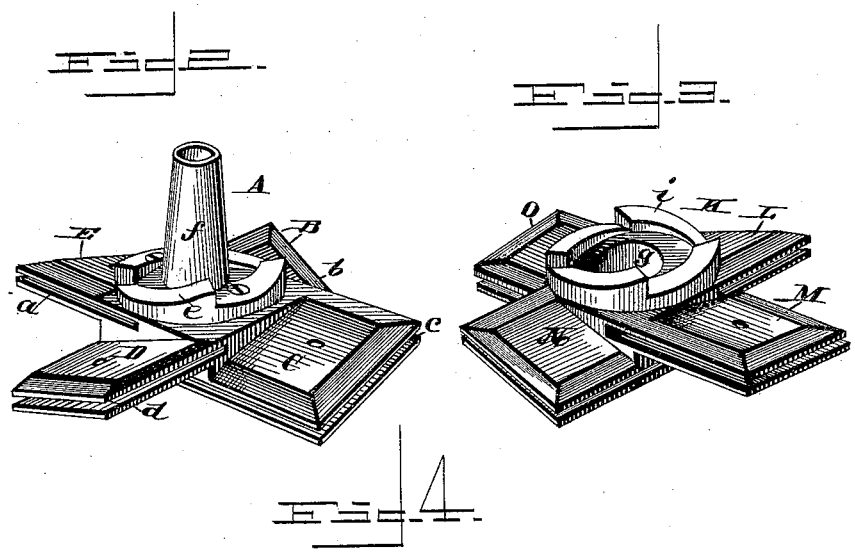
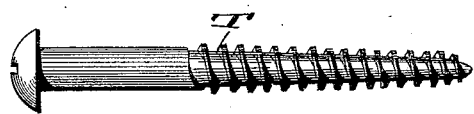
Witnesses,
Walter H. Pumphrey.
Cyrus W. Reinohl
Inventor,
James E. Gibbs
By Johnston, Reinohl & Dyre
Attorney.

UNITED STATES PATENT OFFICE.

JAMES EDWIN GIBBS, OF JONESBOROUGH, TENNESSEE.

CHURN-DASHER.

SPECIFICATION forming part of Letters Patent No. 406,395, dated July 2, 1889.

Application filed March 6, 1889. Serial No. 302,052. (No model.)

*To all whom it may concern:*

Be it known that I, JAMES EDWIN GIBBS, a citizen of the United States, residing at Jonesborough, in the county of Washington and State of Tennessee, have invented certain new and useful Improvements in Churn-Dashers; and I do hereby declare the following to be a full, clear, and exact description of the invention, such as will enable others skilled in the art to which it appertains to make and use the same.

My invention relates to churn-dashers, and has special reference to an improvement on Letters Patent of the United States granted me on September 23, 1879, and March 27, 1888, numbered, respectively, 219,934 and 380,282.

The invention will be hereinafter described, and particularly pointed out in the claims.

In the accompanying drawings, which form part of this specification, Figure 1 represents a side elevation of the upper and lower sections of my improved dasher separated; Fig. 2, a perspective view of a hub for securing the blades of the upper section together; Fig. 3, a similar view of a hub for securing the blades of the lower section, and Fig. 4 a side view of an ordinary screw for joining the two sections to the end of a dasher-rod.

Reference being had to the drawings and the letters thereon, A indicates a hub made of cast metal, preferably malleable iron, and in the form of a Greek cross, the four radial arms of which—B, C, D, and E—being at an angle of about twenty (20) degrees from the horizontal plane of the hub, and bifurcated, as at *a, b, c,* and *d,* for the reception of dasher-blades F G H I, as in Fig. 1. On the surface of the hub A, and integral therewith, is formed a crown-ratchet *e,* from the center of which projects a hollow spindle *f.*

K indicates a hub similar in all respects to hub A, except that the hollow spindle is shorter than that in hub A, projects in the opposite direction, and has an aperture *g* in its center large enough to admit the spindle *f,* and the radial arms L M N O are inclined in the opposite direction from those on hub A, although at the same angle. These hubs A and K having been cast as described, the several parts are joined as follows:

One end of the blades F G H I are inserted in the slots or bifurcations *a, b, c,* and *d* of hub A, and secured in said position by means of small screws *h* passing through the same. The blades P Q R S are secured in like manner to the hub K. Hubs A and K, with the blades attached, are then placed face to face, the hollow spindle *f* on hub A passing through the aperture *g* in hub K, and the teeth on one crown-ratchet engaging with the recesses in the other. Screw T is now passed first through the hub K, then through hub A into the lower end of dasher-rod U, and drawn up as far as may be, allowing the hubs and blades to revolve freely thereon independently of each other.

When in operative position, the parts sustain the relation to each other shown in Fig. 1, and having been arranged and constructed substantially as described the operation is as follows: The dasher, having been inserted in an ordinary reciprocating churn, is thrust down into the cream, which in turn buoys the lower part of the dasher up until the crown-ratchet *i* on hub K engages with the ratchet *e* on hub A. During the downstroke with the hub in the locked position described, and the blades attached to each hub inclined at the same angle to the longitudinal plane of each, but in opposite directions from a vertical plane thereof, it is obvious that the force exerted by the cream impinging upon the under side of each set of said blades will be equal and in opposite directions, so that one will counteract the other, and the dasher will descend to the bottom of the churn without revolving. On the return-stroke, however, it is equally as obvious that the pressure of cream on the upper side of the lower set of blades tends to disengage the crown-ratchet *e* and *i,* when both sets of blades will revolve freely in opposite directions, the upper set being swiveled in the position shown in Fig. 1, and prevented from dropping lower by the end of spindle *f* bearing upon the head of screw T.

Having thus fully described my invention, what I claim is—

1. As an improved article of manufacture, a metallic hub for churn-dashers, having radial arms provided with slots in the plane of the angle of the arms, and a crown-ratchet having a hollow spindle thereon, substantially as described.

2. In a churn-dasher, a metallic hub having radial arms provided with slots in the plane of the angle of the arms, and a crown-ratchet having a hollow spindle projecting therefrom, in combination with detachable blades secured in the slots of the arms of the hub, substantially as described.

3. In a churn-dasher, an upper section having a crown-ratchet on its lower surface, and a hollow spindle projecting from the face of said ratchet, in combination with a lower section having a crown-ratchet on its upper surface, and an inwardly-projecting hollow spindle adapted to receive the spindle of the upper section, in combination with a handle having the sections loosely mounted thereon, substantially as described.

In testimony whereof I affix my signature in presence of two witnesses.

JAMES EDWIN GIBBS.

Witnesses:
A. S. DEADERICK,
JAMES A. PEIRCE.